United States Patent
Ikeda (10) Patent No.: US 6,650,435 B1
(45) Date of Patent: Nov. 18, 2003

(54) IMAGE PROCESSING SYSTEM

(75) Inventor: Hiroshi Ikeda, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/098,143

(22) Filed: Jun. 16, 1998

(30) Foreign Application Priority Data

Jun. 17, 1997 (JP) .............................................. 9-160217

(51) Int. Cl.[7] ................................................. B41B 1/21
(52) U.S. Cl. ........................ 358/1.9; 358/1.15; 358/518
(58) Field of Search ................................. 358/1.9, 1.15, 358/1.1, 1.2, 400, 448, 434, 440, 468, 504, 516, 518–537

(56) References Cited

U.S. PATENT DOCUMENTS

| | | | | |
|---|---|---|---|---|
| 5,339,168 A | * | 8/1994 | Evanitsky et al. | 358/402 |
| 5,467,434 A | * | 11/1995 | Hower, Jr. et al. | 395/114 |
| 5,580,177 A | * | 12/1996 | Gase et al. | 400/61 |
| 5,745,255 A | * | 4/1998 | Yamaguchi | 358/426 |
| 5,877,797 A | * | 3/1999 | Miyashita et al. | 347/106 |
| 5,946,457 A | * | 8/1999 | Nakai et al. | 395/112 |
| 5,991,515 A | * | 11/1999 | Fall et al. | 395/114 |
| 6,330,628 B1 | * | 12/2001 | Motoyama | 710/105 |
| 2002/0080203 A1 | * | 6/2002 | Hakkaku et al. | 347/14 |

FOREIGN PATENT DOCUMENTS

EP  0814400 A2 * 12/1997

* cited by examiner

*Primary Examiner*—Mark Wallerson
(74) *Attorney, Agent, or Firm*—Muserlian, Lucas and Mercanti, LLP (57) ABSTRACT

An image processing system provided with a receiving circuit to receive image selecting information and output environment information; a memory to memorize plural image data and plural image processing conditions being applied to the image data; a selector to select a specific image processing condition from the plural image processing conditions memorized in the memory on the basis of the received output environment information; an image processing circuit to select image data from the plural image data on the basis of the image selecting information and to process the selected image data on the basis of the selected image processing condition; and a transmitting circuit to transmit the processed image data.

9 Claims, 7 Drawing Sheets

IMAGE PROCESSING SYSTEM

BACKGROUND OF THE INVENTION

The present invention relates to an image processing system, particularly to an image processing system used when a place where image data is processed is different from a place where the image data is outputted.

Heretofore, color conversion (color reproduction) processing has been set in accordance with each of outputting equipment. After subjecting image data to color conversion processing, image outputting was conducted.

In addition, following advancement of digitalization of image data, opportunity to look at the digitized image in each of operator's house using an image display means such as a CRT and a computer display has been increased.

As an image outputting means or an image outputted medium, various means have been used. As the image outputting means, a CRT display device, a liquid crystal display device and a plasma display device are cited.

With regard to printers, there are not only differences of the outputting system of printers (such as laser printers, ink jet printers, thermal transfer printers and dye transfer sublimation thermal printers?) but also differences of the kind of recording mediums which is an outputting medium (such as plain paper, photographic paper and cloth).

As described above, there are many kinds of outputting means. Even when outputting by any of aforesaid outputting means, it is desired to provide appropriate color matching processing of image data to be outputted at a desired color reproduction.

However, conventional color matching processing is processing which assumes a specific image outputting means, a specific image outputted medium or their combination. They have not coped with various kinds of image outputting means, image outputted medium and their combination.

Accordingly, while a operator views an image displayed on an image display means, color matching processing is set and aforesaid image is outputted by means of an image outputting means. If it is judged that color reproduction is insufficient after viewing the image outputted, color matching processing is set while viewing the image display means until color reproduction becomes sufficient.

As described above, several operations must be repeated. Therefore, great time and labor are necessary. Even if a series of operations are repeated, there are cases when satisfactory color reproduction cannot be obtained.

SUMMARY OF THE INVENTION

The present invention was attained in view of the above-mentioned problems. An objective of the present invention is to provide an image processing system which can conduct image processing simply suitable for any image outputting environment with various combinations and image processing methods.

Namely, the present invention constituting a means for solving the problems is explained in the following items (1)–(26).

(1) An image processing system comprising a receiving means which receives information about image selection and information about the outputting environment, an image data storing means which stores plural image data, a processing conditions storing means which stores image processing conditions subject to the image data, a processing conditions selection means which selects a specific processing condition from various processing conditions stored in the above-mentioned processing conditions storing means based on the above-mentioned information about the outputting environment received, an image processing means which processes image data selected by means of the above-mentioned information about the image selection under specific processing conditions and a sending means which sends image data processed by aforesaid image processing means.

In aforesaid image processing system, information about image selection which selects an image and information about outputting environment related to the environment which outputs image data are received from the operator. Based on information about the outputting environment received, specific processing conditions are selected from processing conditions stored in advance. Based on aforesaid processing conditions selected, selected image data are subjected to the prescribed processing. Aforesaid processed image data are sent to the operator.

Therefore, processing conditions corresponding to plural outputting environment are stored in advance. By conducting image processing after selecting processing conditions corresponding to operators' outputting environment (combination of operators' outputting equipment and outputted medium), image processing suitable for any specific image outputting environment in various combinations can be simply conducted.

(2) In an invention described in Item 1, information about outputting equipment related to the kind or characteristics of a specific type of outputting equipment which outputs image data is contained in the above-mentioned information about the outputting environment.

Information about the outputting environment containing information about outputting equipment related to the kind or characteristics of the outputting equipment which outputs image data, and in a method of image processing, processing conditions corresponding to plural outputting environment are stored in advance. By conducting image processing after selecting processing conditions corresponding to operators' outputting environment (combination of operators' outputting equipment and an outputted medium), image processing suitable for image outputting environment in various combinations can simply be conducted.

(3) In an invention described in Item 1, information about outputting equipment related to the kind or characteristics of outputting media to which image data is outputted contained in the above-mentioned information about the outputting environment.

Information about the outputting environment containing information about outputting equipment related to the kind or characteristics of an outputted medium which outputs image data, and in a method of image processing, processing conditions corresponding to plural outputting environment are stored in advance. By conducting image processing after selecting processing conditions corresponding to operators' outputting environment (a combination of operators' outputting equipment and outputted medium), image processing suitable for the specific image outputting environment in various combinations can simply be conducted.

(4) In inventions described in Items 1 through 3, processing conditions stored in the above-mentioned processing conditions storing means is based on information about image processing characteristics for conducting color reproduction corresponding to a specific outputting environment.

(5) In inventions described in Items 1 through 4, the above-mentioned receiving means automatically receives the above-mentioned information about the outputting environment based on receiving the above-mentioned information about image.

Processing conditions corresponding to plural outputting environment are stored in advance. By conducting image processing after selecting processing conditions corresponding to operators' outputting environment (kind and characteristics of outputting equipment and outputted medium), image processing suitable for image outputting environment with various combination can simply be conducted.

(6) An image processing system comprising a receiving means which receives a processing mode selection signal and information about a first outputting environment and information about a second outputting environment, a processing conditions storing means which stores image processing conditions provided to image data, a processing conditions selection means which selects specific processing conditions from among several processing conditions stored in the above-mentioned processing conditions storing means, an image processing means which conducts processing under the above-mentioned specific processing conditions, a sending means which sends image data processed by aforesaid image processing means and a control means which selects either a first processing mode which sends image data after processing image data under processing conditions based on the above-mentioned first information about outputting environment received or a second processing mode which sends image data after processing image data under processing conditions based on the above-mentioned second information about outputting environment received by means of the above-mentioned processing mode selection signal.

In aforesaid image processing system, the first and the second information about outputting environments related to environment which outputs a processing mode selection signal and image data is received by the operator. Referring to the processing mode selection signal received, based on either of the first or the second information about outputting environment, a specific processing condition is selected from among the processing conditions stored in advance. Based on the processing conditions selected, prescribed processing is provided to image data selected. This image data processed is sent to the operator.

Processing conditions corresponding to plural outputting environment are stored in advance. By conducting image processing after selecting processing conditions corresponding to operators' outputting environment (a combination of operators' outputting equipment and an outputted medium), image processing suitable for image outputting environment with various combinations can simply be conducted.

(7) In an invention described in Item 6, information about outputting equipment related to the kind or characteristics of outputting equipment which outputs image data is included in the above-mentioned information about the outputting environment.

According to aforesaid image processing method, information about outputting environment containing information about outputting equipment related to kind or characteristics of an outputted medium which outputs image data, and in a method of image processing, processing conditions corresponding to plural outputting environment are stored in advance. By conducting image processing after selecting processing conditions corresponding to operators' outputting environment (combination of operators' outputting equipment and an outputted medium), image processing suitable for image outputting environment with various combination can simply be conducted.

(8) In an invention described in Item 6, information about outputted medium related to the kind or characteristics of an outputted medium which outputs image data is included in the above-mentioned information about the outputting environment.

According to aforesaid image processing method, information about outputting environment including information about outputting equipment related to the kind or characteristics of the outputted medium which outputs image data, and in a method of image processing, processing conditions corresponding to plural outputting environment are stored in advance. By conducting image processing after selecting processing conditions corresponding to operators' outputting environment (a combination of operators' outputting equipment and an outputted medium), image processing suitable for image outputting environment in various combinations can simply be conducted.

(9) In an invention described in any of Items 6 through 8, processing conditions stored in the above-mentioned processing conditions storing means are based on information about image processing characteristics for conducting color reproduction corresponding to outputting environment.

Processing conditions corresponding to plural outputting environment are stored in advance. By conducting image processing after selecting processing conditions corresponding to operators' outputting environment (kinds and characteristics of outputting equipment and outputted medium), image processing suitable for the image outputting environment in various combinations can simply be conducted.

(10) An image processing system comprising a receiving means which receives a processing mode selection signal, information about a first outputting environment and information about a second outputting environment and image data, a processing conditions storing means which stores image processing conditions provided to image data received as above, a processing conditions selection means which selects specific processing conditions from among several processing conditions stored in the above-mentioned processing conditions storing means, an image processing means which processes the above-mentioned image data under the above-mentioned specific processing conditions, a sending means which sends image data processed by aforesaid image processing means and a control means which selects either the first processing mode which sends image data after processing image data under processing conditions based on the above-mentioned first information about outputting environment received or a second processing mode which sends image data after processing image data under processing conditions based on the above-mentioned second information about outputting environment received by means of the above-mentioned processing mode selection signal.

Processing conditions corresponding to plural outputting environment are stored in advance. By conducting image processing after selecting processing conditions corresponding to operators' outputting environment (combination of operators' outputting equipment and an outputted medium), image processing suitable for image outputting environments in various combinations can simply be conducted.

Processing conditions corresponding to plural outputting environments are stored in advance. By conducting image processing after selecting processing conditions corresponding to operators' outputting environment (a combination of operators' outputting equipment and an outputted medium), image processing suitable for image outputting environments in various combinations can simply be conducted.

(11) In an invention described in Item 6, information about outputting equipment related to the kinds or characteristics of an outputting equipment which outputs image data is included in the above-mentioned information about the outputting environment.

Information about outputting environment containing information about outputting equipment related to kind or characteristics of an outputting equipment which outputs image data, and in a method of image processing, processing conditions corresponding to plural outputting environment are stored in advance. By conducting image processing after selecting processing conditions corresponding to operators' outputting environment (a combination of operators' outputting equipment and an outputted medium), image processing suitable for image outputting environments in various combinations can simply be conducted.

(12) In an invention described in Item 10, information about outputted medium related to the kinds or characteristics of an outputted medium to which image data is outputted is included in the above-mentioned information about the outputting environment.

Information-about outputting environment including information about outputting equipment related to the kinds or characteristics of an outputted medium which outputs image data, and in a method of image processing, processing conditions corresponding to plural outputting environment are stored in advance. By conducting image processing after selecting processing conditions corresponding to operators' outputting environment (a combination of operators' outputting equipment and an outputted medium), image processing suitable for image outputting environments in various combination can simply be conducted.

(13) In an invention described in any of Items 10 through 12, processing conditions stored in the above-mentioned processing conditions storing means are based on information about image processing characteristics for conducting color reproduction corresponding to a specific outputting environment.

Processing conditions corresponding to plural outputting environment are stored in advance. By conducting image processing after selecting processing conditions corresponding to operators' outputting environment (kinds and characteristics of outputting equipment and outputted medium), image processing suitable for image outputting environments in various combinations can simply be conducted.

(14) An image processing method wherein information about image selection and information about outputting environment are received specific processing conditions are selected from among processing conditions stored in advance based on the above-mentioned information about the outputting environment received, specific image data are selected from plural image data stored in advance based on the above-mentioned information about image selection received, prescribed processing is provided on the above-mentioned image data selected and aforesaid processed image data are sent.

According to this image processing method, processing conditions corresponding to plural outputting environment are stored in advance. By conducting image processing after selecting processing conditions corresponding to operators' outputting environment (a combination of operators' outputting equipment and an outputted medium), image processing suitable for image outputting environments in various combinations can simply be conducted.

(15) In an invention described in Item 14, information about outputting environment in which information about outputting equipment related to the kinds or characteristics of the outputting equipment which outputs image data is received and specific processing conditions are selected from among the processing conditions stored in advance based on information about the outputting equipment contained aforesaid information about outputting environment.

According to aforesaid image processing method, information about outputting environment containing information about outputted medium related to the kinds or characteristics of an outputted medium which outputs image data, and in a method of image processing, processing conditions corresponding to plural outputting environment are stored in advance. By conducting image processing after selecting processing conditions corresponding to operators' outputting environment (a combination of operators' outputting equipment and outputted medium), image processing suitable for image outputting environments in various combinations can simply be conducted.

(16) In an invention described in Item 14, information about outputting environment in which at least either of information about the outputted medium related to the kind or characteristics of aforesaid outputted medium to which image data are outputted is received. Based on information about the outputted medium contained in aforesaid information about the outputting environment, specific processing conditions are selected from among the processing conditions stored in advance.

According to aforesaid image processing method, information about the outputting environment containing information about outputting equipment related to the kinds or characteristics of an outputted medium which outputs image data, and in a method of image processing, processing conditions corresponding to plural outputting environment are stored in advance. By conducting image processing after selecting processing conditions corresponding to operators' outputting environment (a combination of operators' outputting equipment and outputted medium), image processing suitable for a specific image outputting environments in various combinations can simply be conducted.

(17) In an invention described in Items 14 through 16, processing conditions for conducting color reproducing corresponding to the outputting environment based on information about properties on image processing are stored in advance.

According to aforesaid image processing method, processing conditions meeting plural outputting environment are stored in advance. Processing conditions are selected corresponding to operators' outputting environment (kind and properties of outputting equipment and outputted medium), thereby image processing based on information about properties on image processing for color reproduction can be conducted. Therefore, image processing suitable for various kinds of combination of image outputting environment can simply be conducted.

(18) In an invention described in Items 14 through 17, information about outputting environment is automatically conducted based on receiving of image information.

According to a method of image processing, processing conditions corresponding to plural outputting environment are stored in advance. By conducting image processing after selecting processing conditions corresponding to operators' outputting environment (kind and characteristics of outputting equipment and outputted medium), image processing suitable for image outputting environment with various combination can simply be conducted.

(19) An image processing method wherein a processing mode selection signal and the first and second information about outputting environment are received, either the first processing mode which processes image data under the above-mentioned processing conditions based on the first information about outputting environment received for sending or the second processing mode which processes image data under the above-mentioned processing conditions based on the second information about outputting environment received for sending is selected by the above-mentioned processing mode selection signal, specific processing conditions are selected from processing conditions stored in advance based on information about outputting environment which corresponds to the processing mode selected, prescribed processing is provided to image data based on aforesaid processing conditions selected and aforesaid image data selected is sent.

Processing conditions corresponding to plural outputting environment are stored in advance. By conducting image processing after selecting processing conditions corresponding to operators' outputting environment (combination of operators' outputting equipment and an outputted medium), image processing suitable for image outputting environment with various combination can simply be conducted.

(20) In an invention described in Item 19, the first information about outputting equipment related to the kind or characteristics of the first outputting equipment which outputs image data and second information about outputting environment in which information about outputting equipment related to the kind or characteristics of the second outputting equipment which outputs image data and specific processing conditions are selected from among processing conditions stored in advance based on information about outputting equipment contained in the information about outputting environment corresponding to the processing mode selected.

According to aforesaid image processing method, information about outputting environment containing information about outputting equipment related to the kind or characteristics of outputting equipment which outputs image data is received from a operator, processing conditions meeting plural outputting equipment are stored in advance in an image processing method and image processing is executed after selecting processing conditions in accordance with the environment selected among plural outputting environment by the operator. Due to the above, image processing suitable for image outputting environment with plural and various combination.

(21) In an invention described in Item 19, the first information about outputting environment in which information about outputted medium related to the kind or characteristics of the first outputted medium which outputs image data and the second information about outputting environment in which information about outputted medium related to the kind or characteristics of the second outputted medium which outputs image data are received and specific processing conditions are selected from among the processing conditions stored in advance based on information about outputted medium contained in information about outputting environment corresponding to the processing mode selected.

According to aforesaid image processing method, information about outputting environment containing information about outputted medium related to the kind or characteristics of outputted medium which outputs image data is received from a operator, processing conditions meeting plural outputted medium are stored in advance in an image processing method and image processing is executed after selecting processing conditions in accordance with the envi-ronment selected among plural outputting environment by the operator. Due to the above, image processing suitable for image outputting environment with plural and various combination.

(22) In inventions described in Items 19 through 21, processing conditions for conducting color reproduction corresponding to outputting environment based on information about image processing property are stored in advance.

Processing conditions corresponding to plural outputting environment are stored in advance. By conducting image processing for color reproduction based on information about image processing characteristics after selecting processing conditions corresponding to operators' outputting environment (kind and characteristics of outputting equipment and an outputted medium), image processing suitable for image outputting environment with various combination can simply be conducted.

(23) An image processing method wherein a processing mode selection signal, the first and second information about outputting environment and image data are received, either the first processing mode which processes image data under the above-mentioned processing conditions based on the first information about outputting environment received for sending or the second processing mode which processes image data under the above-mentioned processing conditions based on the second information about outputting environment received for sending is selected by the above-mentioned processing mode selection signal, specific processing conditions are selected from processing conditions stored in advance based on information about outputting environment which corresponds to the processing mode selected, prescribed processing is provided to image data based on aforesaid processing conditions selected and aforesaid image data selected is sent.

Processing conditions corresponding to plural outputting environment are stored in advance. By conducting image processing after selecting processing conditions corresponding to operators' outputting environment (combination of operators' outputting equipment and an outputted medium), image processing suitable for image outputting environment with various combination can simply be conducted.

(24) In an invention described in Item 23, the first information about outputting environment in which information about outputting equipment related to the kind or characteristics of the first outputting equipment which outputs image data and the second information about outputting environment in which information about outputting equipment related to the kind or characteristics of the second outputting equipment which outputs image data are received and specific processing conditions are selected from among the processing conditions stored in advance based on information about outputting equipment contained in information about outputting environment corresponding to the processing mode selected.

Information about outputting environment containing information about outputting equipment related to kind or characteristics of an outputting equipment which outputs image data, and in a method of image processing, processing conditions corresponding to plural outputting environment are stored in advance. By conducting image processing after selecting processing conditions corresponding to operators' outputting environment (combination of operators' outputting equipment and an outputted medium), image processing suitable for image outputting environment with various combination can simply be conducted.

(25) In an invention described in Item 23, the first information about outputting environment in which information about outputted medium related to the kind or characteristics of the first outputted medium which outputs image data and the second information about outputting environment in which information about outputted medium related to the kind or characteristics of the second outputted medium which outputs image data are received and specific processing conditions are selected from among the processing conditions stored in advance based on information about outputted medium contained in information about outputting environment corresponding to the processing mode selected.

Information about outputting environment containing information about outputted medium related to kind or characteristics of an outputted medium which outputs image data, and in a method of image processing, processing conditions corresponding to plural outputting environment are stored in advance. By conducting image processing after selecting processing conditions corresponding to operators' outputting environment (combination of operators' outputted medium and an outputted medium), image processing suitable for image outputting environment with various combination can simply be conducted.

(26) In inventions described in Items 23 through 25, processing conditions for conducting color reproduction in accordance with outputting environment based on information about image processing property are stored in advance.

Processing conditions corresponding to plural outputting environment are stored in advance. By conducting image processing for color reproduction based on information about image processing characteristics after selecting processing conditions corresponding to operators' outputting environment (kind and characteristics of outputting equipment and an outputted medium), image processing suitable for image outputting environment with various combination can simply be conducted.

DETAILED DESCRIPTION OF THE PREFERRED EMBODIMENT

An image processing system of the present invention will be explained referring to drawings.

<Constitution of Image Processing System (1)>

Figure 3:
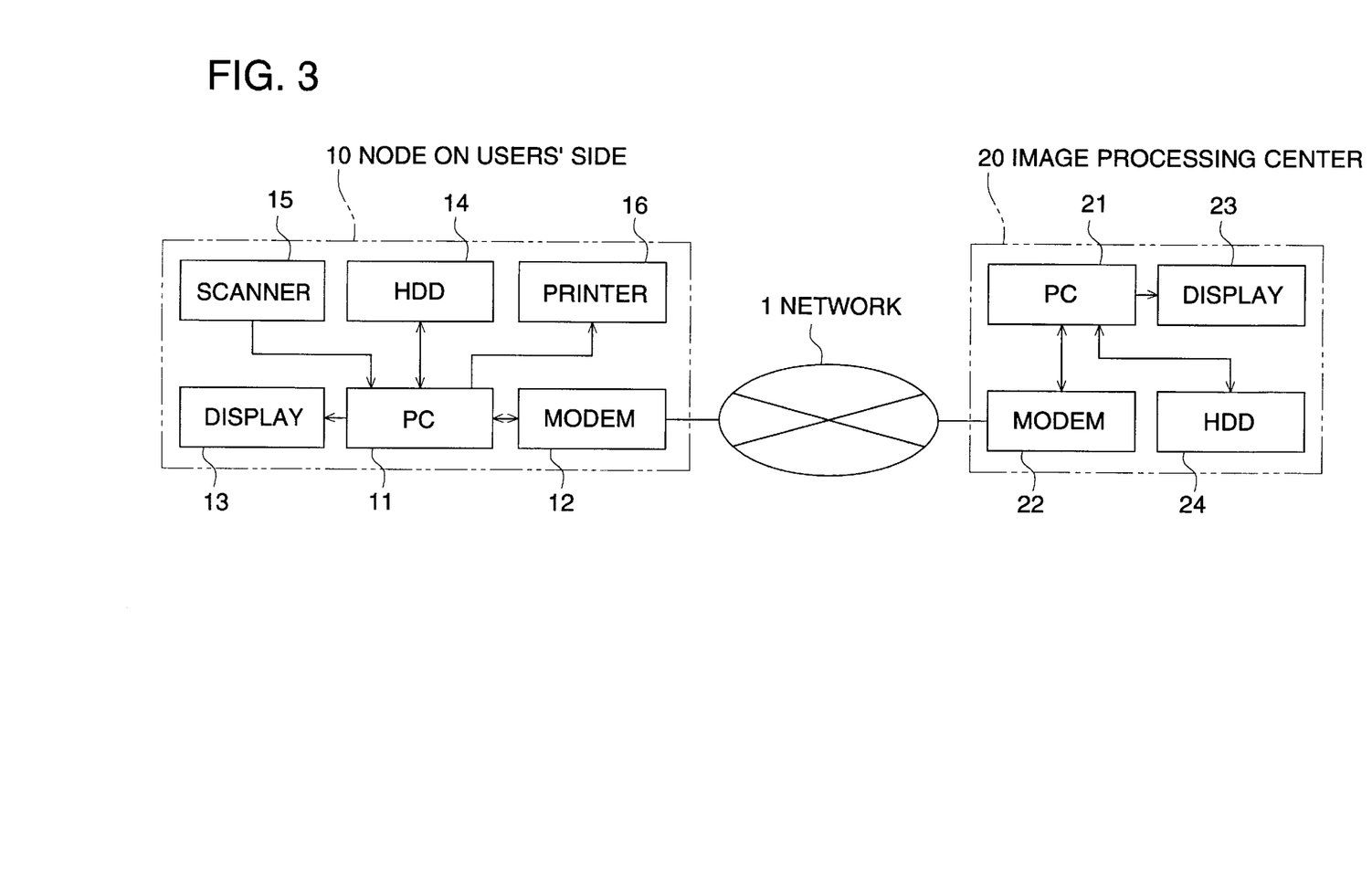
FIG. 3 is a block diagram showing an electrical constitution of an image processing system used in the embodiment of the present invention for each of functional block.

First, referring to FIG. 3, schematic block diagram of an image processing system to which an embodiment of Example of the present invention will be explained.

Generally, the image processing system of the present invention is constituted of node 10 of the operators' side and image processing center 20.

Numeral 10 represents the node of the operators' side, which can be connected to a network (public communication circuit and specialized circuit) such as in an ordinary household and office. It is possible to display or print image file composed of image data.

Numeral 20 represents an image processing center. It is equipped with a function to send image data selected by a operator after providing image processing (for example, color matching) suitable for output format desired by the operator.

PCs 11 and 21 represent a personal computer, household game machine or a digital camera capable of handling image file composed of image data and communicating such. It is preferable that an inputting means such as a keyboard and a pointing device and a outputting means, such as a display, composed of an CRT and a liquid crystal display element. Incidentally, in the present embodiment, a personal computer is used for node 10 of the operators' side.

Modems 12 and 22 function as a sending means and a signal modulation means for sending signals sent in PC on network 1, and also functions as a receiving means and a signal demodulation means which conducts an opposite conversion. Each modem may be housed integrally with each PC, or may be connected to each PC through a cable or a slot.

As a sending means and a receiving means of the present invention, for example, an analogue modem is cited. When a digital circuit is used, a signal conversion means meeting data in each network can be used. For example, a network card, TA, ATM, PIAFS and ASDL can be used.

Incidentally, network 1 which is a communication means belongs to each electrical communication circuit equipment. It may either of an analogue transfer path (an analogue public circuit network), a digital transfer path (a synchronous digital circuit network (STM circuit) or a non-synchronous digital circuit network (ATM circuit). In the present embodiment, each connection including an internet connection and a LAN connection may be included. When a digital circuit is used, a signal conversion means fitting to data of each net work, a sending means and a receiving means are used in place of the above-mentioned modem.

Hard discs 14 and 24 function as a storing means which store image file. In addition, they store each control program and, as necessary, they can execute a program by reading data in each PC. In addition, as necessary, recording medium such as a photo-magnetic disc and CD-ROM.

Incidentally, in the present embodiment, plural image data are housed in advance in hard disc 24, which is an image disc storing means, on the side of image processing center 20. In addition, processing conditions of image data matching each environment of the operator is housed in hard disc 24 which also functions a processing conditions storing means in the form of a table style.

As an image data storing means and a processing conditions storing means of the present invention, for example, a digital information recording medium such as a memory, an RAM (including DRAM, SDRAM, a flash memory, a miniture card, a compact flash, a smart media and a PC card), a hard disc, variousROMs (mask ROM, EPROM, EEPROM), CD-ROM, CD-RW, CD-R, MT, DATan FD, an MD, an MO and a DVD and their recording device can be used. Specifically, the memory, the RAM and the hard disc are preferable. In addition, the image data storing means may be the same or different as/from the processing conditions storing means.

In addition, as a processing conditions selection means, an image processing means and a control means of the present invention, for example, a CPU can be used. However, the present invention is not limited thereto. DSP and a custom IC can also be used. In addition, the processing conditions selection means, the image processing means and the control means may be separate each other, or they are integral devices.

<Basic Operation of an Image Processing System>

Figure 1:
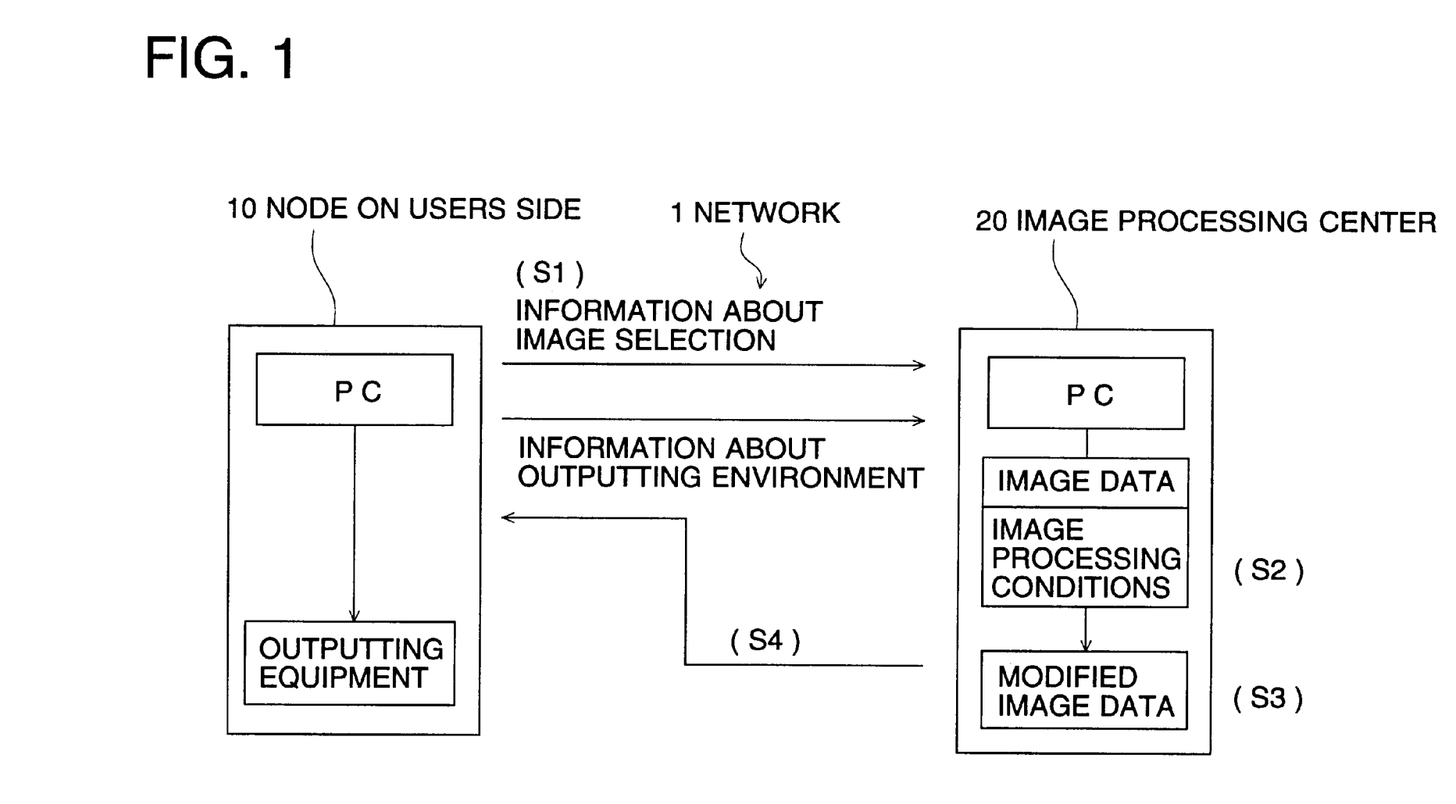
FIG. 1 is an operation block diagram mechanically showing operation of an image processing system used in the embodiment of the present invention.
Figure 2:
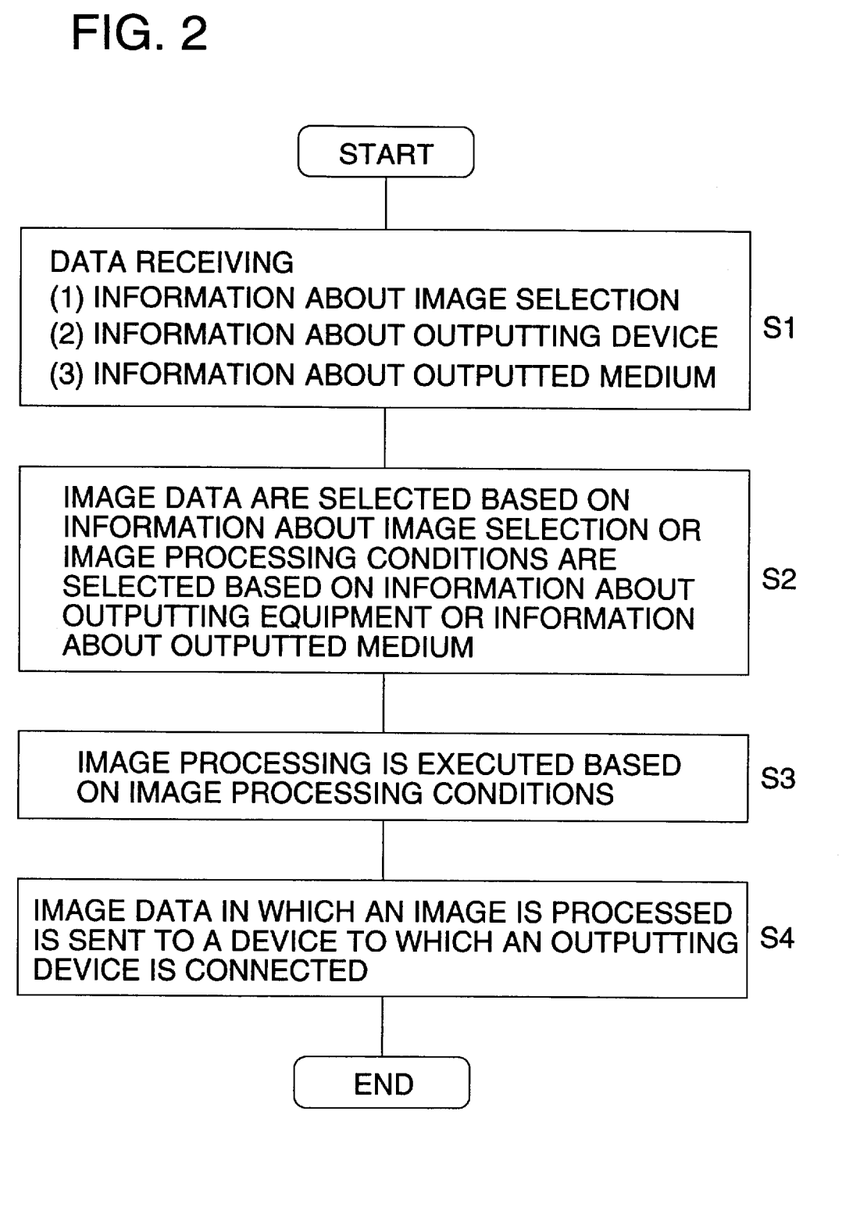
FIG. 2 is a flow chart showing entire processing procedure of an image processing system used in the embodiment of the present invention.

Here, referring to an operation block diagram as shown in FIG. 1 and a flow chart as shown in FIG. 2, operation of an image processing system of the present embodiment will be explained.

First, a list of image data capable of selecting in any form is sent to node 10 of the operators' side. In this occasion, it is also possible to display a list of image data capable of being selected from image processing center 20 on node 10 of the operators' side in a menu format. In addition, it is also allowed to send a print material of a pamphlet type to the operator.

The operator sends, to image processing center 20, information about image selection containing the file name of image data and an image data number, if an image which is desired to be outputted exists, through network 1.

Accompanying above, information about output environment (information about outputting equipment and information about outputted medium) is sent to image processing center 20 through network 1. Incidentally, aforesaid information about output environment may arrange that the environmental setting of the operator may be read by a program in such a manner that aforesaid information about outputting environment is automatically conducted accompanying sending of the information about image selection. In addition, The operator may send data after inputting outputting environment information manually.

Here, "information about outputting equipment" which constitutes information about outputting environment includes equipment characteristics or kind of equipment when a operator record-outputs (prints out by means of a printer) an image in an image file which has already been subjected to color matching processing sent from an image processing center and display-outputs (image display on a displaying device).

In addition, "information about outputted medium" which constitutes information about outputting environment includes characteristics or kind (name of manufacturer and sales company) of a recording paper when a operator record-outputs (prints out) an image in an image file which has already been subjected to color matching processing sent from an image processing center.

As aforesaid information about outputting environment, in the case of image display or in the case of using a recording paper which is set on a printer, only information about outputting equipment is cited. If a recording paper not set on the printer is used, the information about outputting environment is a combination of information about outputting equipment and information about outputted medium. Information about outputted medium may be information such as a plain paper and cloth, not the name of manufacturer or a product serial number.

Data sent from node 10 of the operators' side shall include at least above-mentioned information about image selection and information about outputting environment. In addition, it also include display of intention to desire color matching processing and personal information capable of identifying a operator in order to enable to send data from image processing center 20.

In addition, the above-mentioned information about image selection and information about outputting environment may directly be connected to image processing center 20. It is also allowed to connect to the transfer center nearest to node 10 of the operators' side, and then, transferred to the image processing center selected by the operator through the transfer center.

If image processing center provided with image data approximately equal each other exists plurally, it is also possible to judge where to transfer the image file at the transfer center based on operation condition of image processing center 20, condition of congestion and the located place of node 10 of the operators' side, and to transfer data to the most suitable image processing center 20.

Information about image selection and information about outputting environment (information about outputting equipment and information about outputted medium) sent image processing center 20 through the transfer center or network 1 are converted to a signal sent standardly inside PC 21 by means of modem 22 which is a receiving means, and temporarily housed in the memory or hard disc 24 (see FIG. 1 S1 and FIG. 2 S1).

When a series of transfer of information about image selection and information about outputting environment is completed, in image processing center 20, based on information about image selection and information about outputting environment received, image data and specific processing conditions coming under from plural image data and image processing conditions stored in advance in HDD 24 (see FIG. 1S2 and FIG. 2S2).

Here, "image processing conditions" means information about image processing characteristics for conducting color reproduction in accordance with operator's outputting environment (combination of each equipment and medium). Here, HDD 24 (a means for storing processing conditions) stores conditions related to color as processing conditions. Due to this, color matching processing can be conducted correctly.

Here, HDD 24 constitutes a means for storing image processing conditions. HDD 24 may be a memory for PC 21. In addition, the CPU in PC 21 constitutes a means for selecting processing conditions which selects processing conditions suitable for information about outputting environment from the operator.

HDD 24 (a means for storing processing conditions) stores (1) plural processing conditions for each of kind or characteristic contained in the information about outputting environment, (2) plural processing conditions for each of kind or characteristic contained in the information about outputting environment and for each of kind or characteristic of outputted medium to which image data is outputted, and (3) processing conditions in a table format (LUT) and an operation equation format.

By storing plural processing conditions on advance, it is possible to execute image processing after selecting processing conditions immediately meeting operators' outputting environment and to conduct image processing simply which suits image outputting environment having variety of combination.

Based on the above-mentioned processing conditions, the selected image is subjected to color matching processing as image processing by the image processing means (see FIG. 1 S3 and FIG. 2 S3), and image data (see FIG. 1: modified image data) after color matching processing is temporarily stored in the memory or hard disc 24 as a file different from the original image data.

If image data sent from the operator is data represented by red R1, green G1 and blue B1, color matching processing is provided for each color. Image data generated due to processing is stored as data represented by red R2, green G2 and blue B2. Due to this, image processing simply which suits image outputting environment having variety of combination can be conducted.

Image processing center 20 sends image file in which image processing such as color matching processing is provided to a device to which an outputting equipment is connected on the operator side (such as node 10 of the operators' side) through network 1 by means of modem 22 which also functions as a sending means from personal computer (PC) 21 (see FIG. 1 S4 and FIG. 2 S4).

By adding information which cannot be modified on the operator's side to image data in which image processing is provided, unnecessary image processing can be prevented on the operator's side. To the contrary, it is also possible to conduct image processing under a condition that image processing in the outputting equipment on the operator side is considered on image processing center 20 side, and entrust final image processing to the operator.

With regard to image file, prior to color matching processing, which is temporarily house in the memory or hard disc 24 and image file after color matching processing, it is possible to store for a while in the memory or hard disc 24 after sending to node 10 of the operator's side.

If the operator requested color matching processing of the same image file, PC 21 may provide color matching processing the image file housed in hard disc 24 or the image file may be sent to the other image processing center.

If the image file after aforesaid color matching processing is housed in correspondence with the image file prior to the color matching processing, rapid treatment can be conducted by sending the image file after color matching processing housed without conducting color matching when the operator necessitates image data provided with the same color matching processing as the same image file.

<Processing of the Image Processing System (2)>

Figure 4:
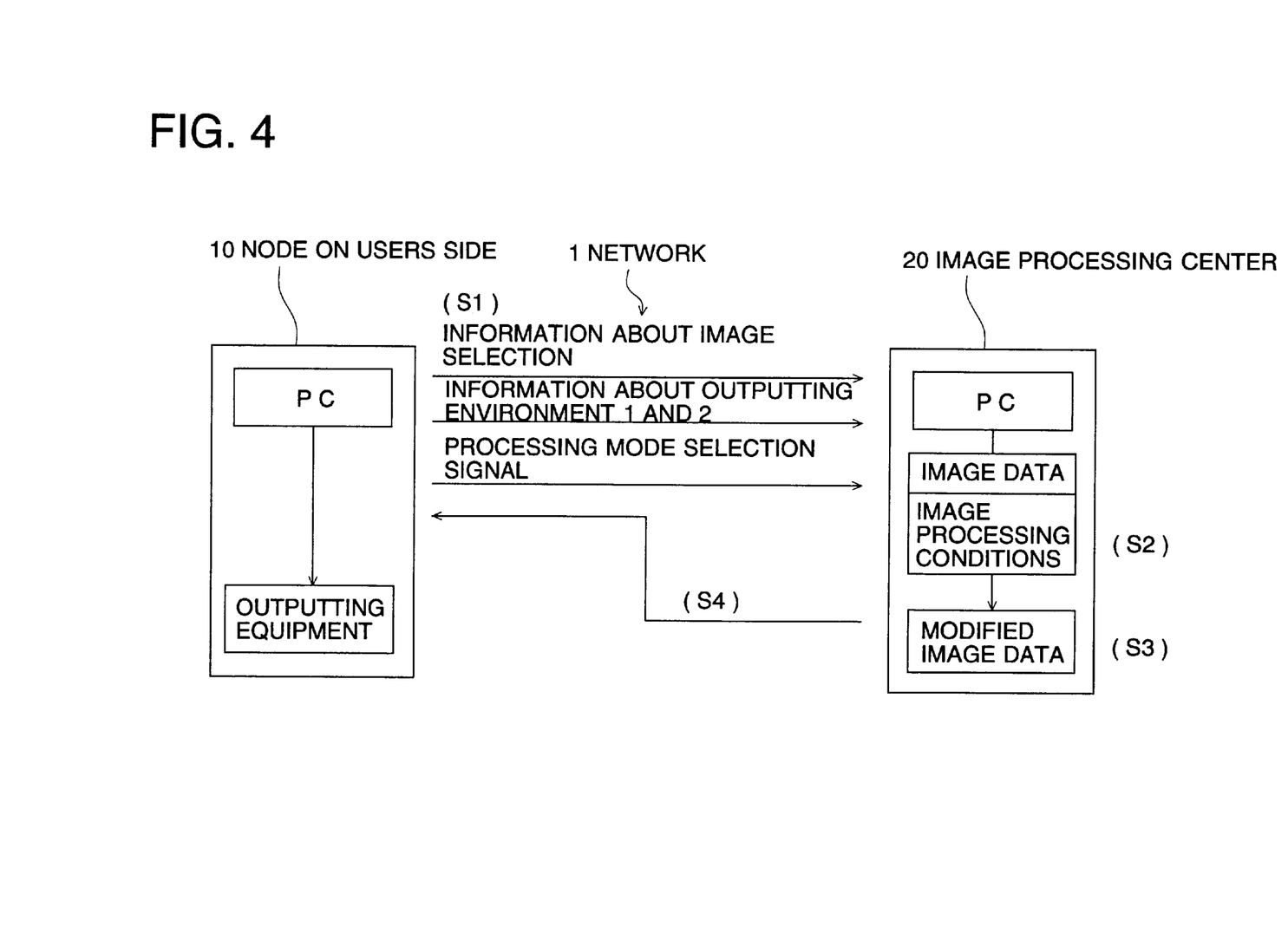
FIG. 4 is an operation block diagram mechanically showing operation of an image processing system used in the other embodiment of the present invention.

FIG. 4 is an operation block diagram of another example. Basically, the operation in FIG. 4 is the same as in FIG. 1. In FIG. 4, node 10 of the operators' side sends plural information about outputting environment.

In an Example shown in FIG. 4, from node 10 of the operators' side, information about image selection, information about outputting environment 1, information about outputting environment 2 and a processing mode selection signal are sent to image processing center 20. (see FIG. 4 S1)

For example, information about outputting environment 1 is information about outputting environment which can be arbitrarily set by a operator and which can be set regardless of an outputting equipment actually connected to node 10 of the operators' side. Information about outputting environment 2 causes that parameters of outputting equipment connected to node 10 of the operators' side are automatically fed.

It is set that the operator side can send by which mode either processing mode 1 (processing mode based on information about outputting environment 1) or processing mode 2 (processing mode based on information about outputting environment 2) image processing is desired by means of a signal for selecting a processing mode.

In image processing center 20, information about image selection, information about outputting environment 1 and 2 and a processing mode selection signal are received. The control means selects a processing mode. Based on information about outputting environment which corresponds to a processing mode selected, image data selected among plural image data are identified. From processing conditions stored in advance, specific processing conditions are selected (see FIG. 4 S2).

Namely, in the present embodiment, CPU of PC 21 in image processing center 20 constitutes a processing conditions selection means which selects processing conditions and a control means which determines a processing mode.

Next, based on the processing conditions selected, image data selected are subjected to a prescribed processing (see FIG. 4 S3). Aforesaid processed image data are sent to node 10 of the operators side (see FIG. 4 S4).

According to aforesaid image processing method, processing conditions corresponding to plural outputting environment are stored in advance. By conducting image processing after selecting processing conditions corresponding to environment selected from plural outputting environment (information about outputting environment 1 and 2) on the operator's side, image processing suitable for image outputting environment with various combination can simply be conducted.

The operator can obtain image data, subjected to image processing, suitable for an arbitrary equipment which would like to be outputted not limited to an outputting equipment actually connected.

<Processing of an Image Processing System (3)>

Figure 5:
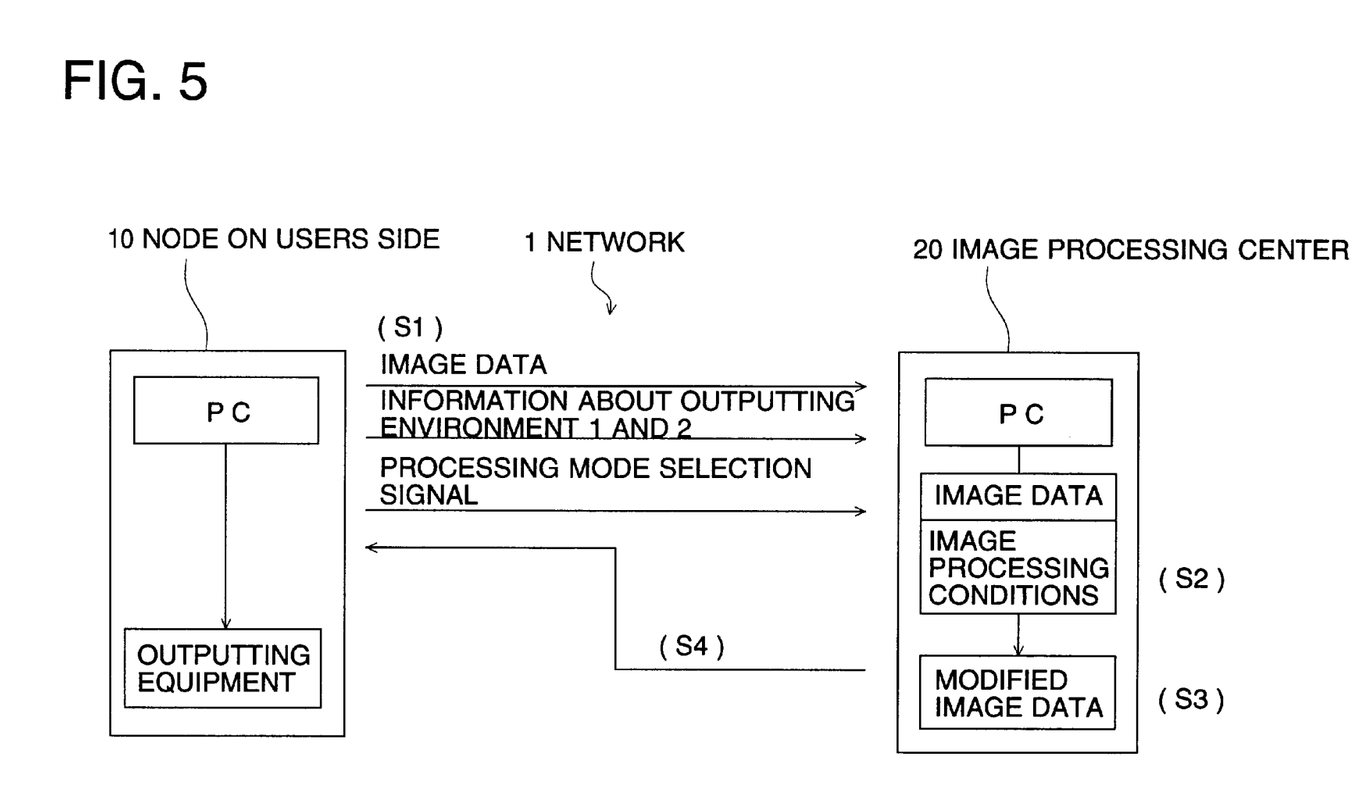
FIG. 5 is an operation block diagram mechanically showing operation of an image processing system used in still another embodiment of the present invention.

FIG. 5 is an operation block diagram of an another embodiment of the present invention. Basically, operation in FIG. 5 is the same as that in FIGS. 1 and 4. Node 10 of the operators' side sends plural information about outputting environment. It sends image data.

In an Example shown in FIG. 5, from node 10 of the operators' side, image data, information about outputting environment 1, information about outputting environment 2 and a processing mode selection signal are sent to image processing center 20. (see FIG. 5 S1)

Namely, it is not necessary to accumulate plural image data in image processing center 20 in advance.

For example, information about outputting environment 1 is information about outputting environment which can be arbitrarily set by a operator and which can be set regardless of an outputting equipment actually connected to node 10 of the operators' side. Information about outputting environment 2 causes that parameters of outputting equipment connected to node 10 of the operators' side are automatically fed.

It is set that the operator side can send by which mode either processing mode 1 (processing mode based on information about outputting environment 1) or processing mode 2 (processing mode based on information about outputting environment 2) image processing is desired by means of a signal for selecting a processing mode.

In image processing center 20, information about outputting environment 1 and 2 and a processing mode selection signal are received. From processing conditions stored in advance, specific processing conditions are selected (see FIG. 4 S2).

Next, based on the processing conditions selected, image data selected are subjected to a prescribed processing (see FIG. 5 S3). Aforesaid processed image data are sent to node 10 of the operators side (see FIG. 5 S4).

According to aforesaid image processing method, processing conditions corresponding to plural outputting environment are stored in advance. By conducting image processing after selecting processing conditions corresponding to environment selected from plural outputting environment (information about outputting environment 1 and 2) on the operator's side, image processing suitable for image outputting environment with various combination can simply be conducted.

The operator can obtain image data, subjected to image processing, suitable for an arbitrary equipment which would like to be outputted not limited to an outputting equipment actually connected.

<Processing of the Image Processing System (4)>

Incidentally, in image processing center 20, not only any one operation of the above-mentioned processing (1) through (3), but also a processing ability in which several processing are combined so that operation mode may be switched in accordance with information received from node 10 of the operators' side. Due to this, further flexible reaction becomes possible, and thereby various demand from the operators can be satisfied.

As an outputting equipment in the present specification, printers in which an image is printed on a photographic light-sensitive material such as a photographic paper by means of a laser, a monitor and an LED array, ink jet printers, laser beam printers, thermo-transfer printers and sublimation type printers, a CRT display device, a liquid crystal display device, a plasma display device and a printer corresponding to digital data can be used. As an outputted medium, papers such as a glossy paper and a plain paper, a photographic paper and cloth can be used.

Incidentally, an image processing system may be composed only of a portion where image processing is conducted, or the image processing system may include an outputting means which outputs an image, or the image processing system may further include an image reading means. In addition, the image processing system may integrally include all means constituting the system. In addition, the image processing system may further include separate apparatuses.

In addition, an image processing auxiliary system in which information about outputting environment from the node on the operators' side is received by means of a receiving means, suitable image processing conditions are selected from among plural image processing conditions stored by means of processing conditions selection means and selected image processing conditions are sent to the node on the operators' side by means of a sending means. In such an occasion, image processing is conducted by the node on the operators' side.

<Constitution and Processing of the Image Processing System (2)>

Figure 6:
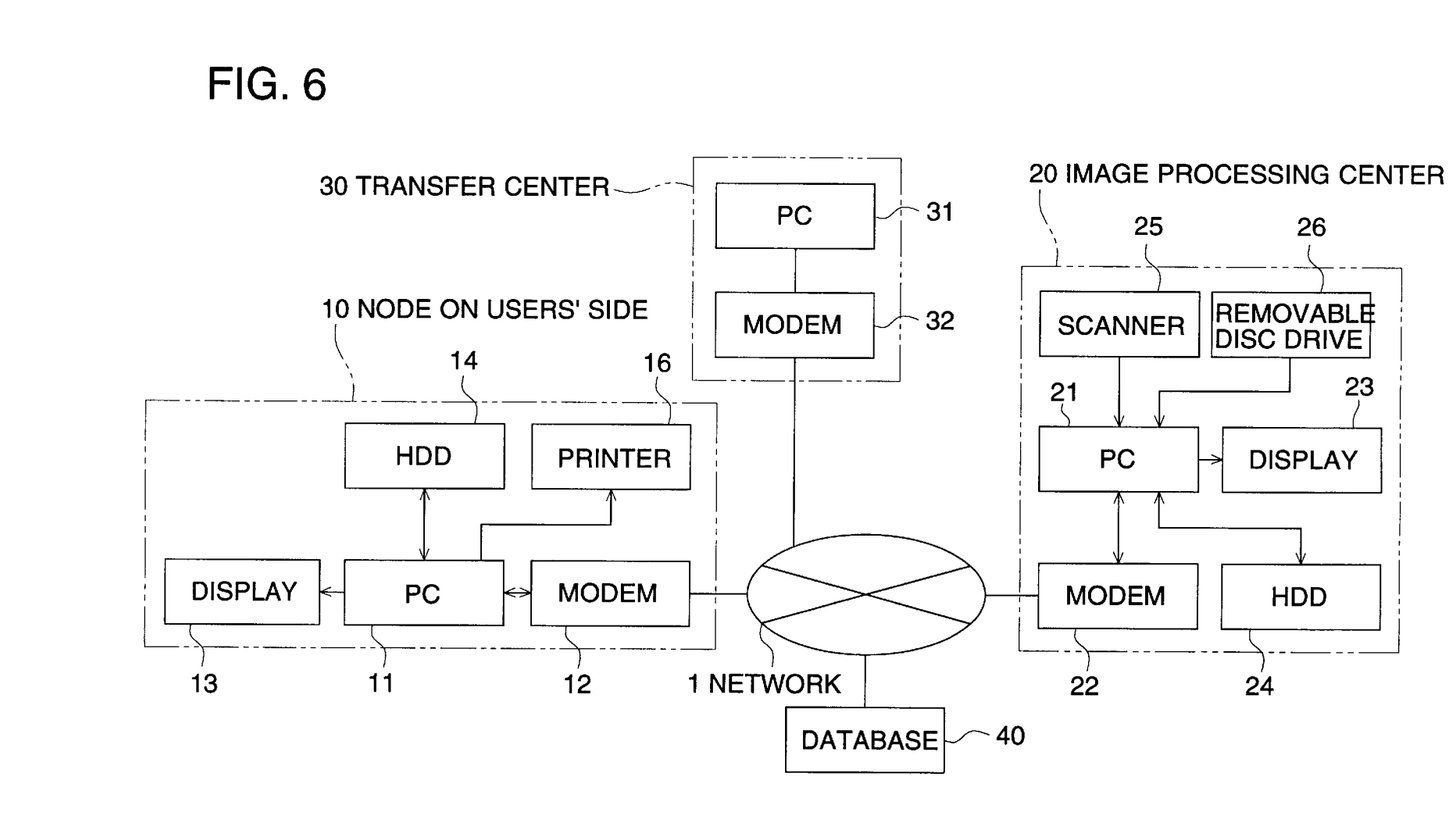
FIG. 6 is an operation block diagram mechanically showing operation of an image processing system used in still another embodiment of the present invention.

FIG. 6 shows an image processing system of another embodiment of the present invention. Blocks having the same function as the image processing system in FIG. 3 is affixed with the same numerals.

In the present embodiment, image processing center 20 is provided with, as a reading means, scanner 25 and removable disc drive 26 such as an FD drive and an MO disc drive.

Aforesaid reading means reads a recording medium such as an FD carried or sent by a operator for copying an image file, or a print image carried or sent by the use is scanned for reading. After reading, the data is subjected to a prescribed image processing in PC21. Following this, it is housed in hard disc 24 as an image file.

Other operations and processing are the same as those described in <Constitution and processing of an image processing system (1)><Fundamental operation of the image processing system><Processing of an image processing system (2)><Processing of an image processing system (3)><Processing of an image processing system (4)>.

<Constitution and Processing of an Image Processing System (3)>

Figure 7:
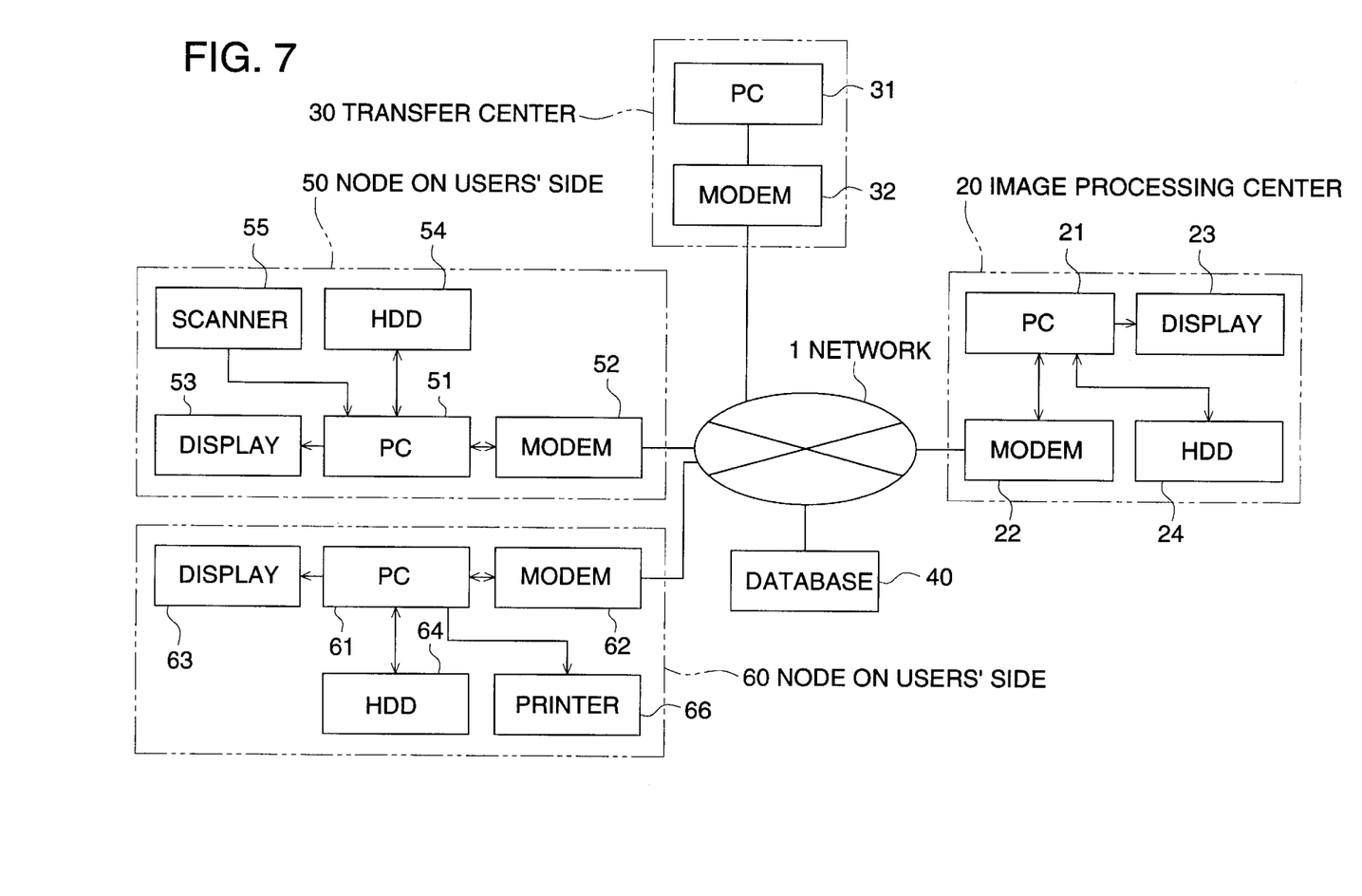
FIG. 7 is an operation block diagram mechanically showing operation of an image processing system used in still another embodiment of the present invention.

FIG. 7 shows an image processing system of still yet another embodiment. Blocks having the same function as the image processing system in FIGS. 3 and 6 are affixed with the same numerals.

The present embodiment shows a case in which printing out cannot be conducted because a printer is not provided though image reading is possible since node 50 on the operators' side is provided with scanner 55 as a reading means. In addition, a case in which display 53 is not suitable for color image display is included. In addition, a case in which image outputting is not suitable for color image or color image display even though a printer is provided is included. For example, node 50 on the operators' side is a personal computer located in a house or an office. Node 60 on the operators' side means a house or an office having a printer, a high quality color printer or a printing machine suitable for color image. It is considered that an image processing center is arranged to exist independently. Or, it is considered that node 60 on the operators' side is a shop in which image outputting is serviced and that the image processing center is a headquarters administrating plural shops.

Node 60 on operators' side is supposed to provide printer 66 suitable for a printer preparing color image and a display suitable for the display of color image. In such a case, an image processing request is sent to image processing center 20 from node 50 on operators' side. In such a case, an image file may be sent. If information about outputting environment from display 63 or printer 66 and the first and second information about outputting environment are sent, an processing mode selection signal and information about image selection are sent together with an image processing request.

Incidentally, in such an occasion, node 50 on the operators' side requests to send an image file subjected to color matching processing to node 60 on operators' side in which an outputting equipment is connected.

Other operations and processing are the same as those described in <Constitution and processing of an image processing system (1)><Fundamental operation of the image processing system><Processing of an image processing system (2)><Processing of an image processing system (3)><Processing of an image processing system (4)>.

As described above, owing to the present invention, the following effects can be obtained.

According to an invention of an image processing system described in Item 1 and a method of image processing described in Item 14, processing conditions corresponding to plural outputting environment are stored in advance. By conducting image processing after selecting processing conditions corresponding to operators' outputting environment (combination of operators' outputting equipment and an outputted medium), image processing suitable for image outputting environment with various combination can simply be conducted.

The disclosed embodiment can be varied by skilled person without departing from the spirit and scope of the invention.

What is claimed is:

1. A color image processing system, comprising:
    a first color image output device to visualize color image data and having a first communicating device to transmit the color image data together with first color visualizing environment information representing at least the type of the first color output device through a network;

a second color output device different in type from the first color output device, to visualize color image data and having a second communicating device to transmit the color image data together with the second color visualizing environment information representing at least the type of the second color output device through the network; and a color processing center having a central communicating device for receiving color image data and color visualizing environmental information from said first and second communicating device through the network, memorizing means for memorizing a plurality of color matching modes including a first color matching mode correlated with the first color visualizing environment information and a second color matching mode correlated with the second color visualizing environment information, an image processing means for processing color image data wherein the color processing center conducts color matching in such a way that when the central communicating device receives the first color visualizing environment information, the processing section processes the color image data in accordance with the first color matching mode and when the central communicating device receives the second color visualizing environment information, the processing section processes the color image data in accordance with the second color matching mode and transmitting means for transmitting the color image data processed by the image processing means to the respective color image output device so that the color image output device visualizes the processed color image data with a desired color.

2. The image processing system of claim 1, wherein the color visualizing environment information includes output device information regarding a type of an output device to output the image data and said output device is a CRT display, a liquid crystal display, a plasma display, a laser printer, an inkjet printer, a thermal transfer printer or a sublimation type printer.

3. The image processing system of claim 1, wherein the color visualizing environment information includes output medium information regarding a kind of an output medium to which the image data is outputted and said output medium is a glossy paper, plain paper, photographic paper or cloth.

4. The color image processing system of claim 1, wherein the first color image output device is a first color image printer to visualize the color image data on a first color recording sheet and the second color image output device is a second color image printer different in type from the first color image printer and to visualized the color image data on a second color recording sheet different in kind from the first color recording sheet, and wherein the first color visualizing environment information represents a combination of the type of the first color image printer and the kind of the first color recording sheet and the second color visualizing environment information represents a combination of the type of the second color image printer and the kind of the second color recording sheet.

5. The color image processing system of claim 4, wherein the kind of the first or second color recording sheet is a glossy paper, a plain paper, a photographic paper or cloth.

6. The color image processing system of claim 1, wherein the color processing center further has an image memory to store plural sets of color image data, and wherein the first or second communicating device transmits a image data selecting signal to select color image data from the plural sets of color image data in place of transmitting the color image data and the processing section processes the selected color image data in accordance with the first color matching mode or the second color matching mode.

7. An image processing method, comprising steps of:

receiving color image data and color visualizing environment information at a color processing center from a first color output device and a second color output device selecting a specific output device color matching mode from a plurality of preliminary-memorized of color matching modes on the basis of the color visualizing environment information received by the color processing center;

processing said color image data on the basis of the selecting color matching mode to obtain processed color image data; and transmitting the processed color image data to said first and second image output device.

8. The image processing method of claim 7, wherein the color visualizing environment information includes output device information regarding a type of an output device to output the image data and said output devices is a CRT display, a liquid crystal display, a plasma display, a laser printer, an inkjet printer, a thermal transfer printer or a sublimation type printer.

9. The image processing method of claim 7, wherein the color visualizing environment information includes output medium information regarding a kind of an output medium to which the image data is outputted and said output medium is a glossy paper, plain paper, photographic paper or cloth.

* * * * *